(12) United States Patent
Ootake et al.

(10) Patent No.: US 7,250,997 B2
(45) Date of Patent: Jul. 31, 2007

(54) LIQUID CRYSTAL DISPLAY DEVICE

(75) Inventors: Toshiya Ootake, Fukaya (JP); Yutaka Nakai, Yokohama (JP); Yuko Kizu, Yokohama (JP); Yoshitaka Yamada, Kumagaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 188 days.

(21) Appl. No.: 10/975,478

(22) Filed: Oct. 29, 2004

(65) Prior Publication Data

US 2005/0057704 A1    Mar. 17, 2005

Related U.S. Application Data

(63) Continuation of application No. PCT/JP03/05463, filed on Apr. 28, 2003.

(30) Foreign Application Priority Data

May 1, 2002    (JP)    ............... 2002-129996

(51) Int. Cl.
    *G02F 1/1335*    (2006.01)
(52) U.S. Cl. .................... 349/114; 349/119
(58) Field of Classification Search ............. 349/114, 349/119
    See application file for complete search history.

(56) References Cited

U.S. PATENT DOCUMENTS

2001/0055082 A1    12/2001    Kubo et al.
2004/0105043 A1    6/2004    Fujibayashi et al.
2005/0213006 A1*   9/2005    Baek ................... 349/114

FOREIGN PATENT DOCUMENTS

| JP | 10-161108 | 6/1998 |
|----|-----------|--------|
| JP | 11-242226 | 9/1999 |
| JP | 2000-35570 | 2/2000 |
| JP | 2000-235180 | 8/2000 |
| JP | 2000-258769 | 9/2000 |
| JP | 2002-14233 | 1/2002 |

\* cited by examiner

*Primary Examiner*—James A. Dudek
(74) *Attorney, Agent, or Firm*—Oblon, Spivak, McClelland, Maier & Neustadt, P.C.

(57) ABSTRACT

A liquid crystal display device includes first and second electrode substrates, a liquid crystal layer which is held between the substrates and in which nematic liquid crystal molecules are arranged in substantially parallel to each of the substrates without distortion, first and second optical anisotropic elements respectively disposed on the substrates on the sides opposite to the liquid crystal layer, first and second half-wavelength plates respectively disposed on the optical anisotropic elements, and first and second polarizing plates respectively disposed on the half-wavelength plates. Particularly, the substrate includes a light transmitting section which permits backlight light from the polarizing plate side to transmit therethrough and a light reflecting section which reflects ambient light from the polarizing plate side and at least one of the optical anisotropic elements is formed of two retardation plates having a retardation in a plane.

6 Claims, 4 Drawing Sheets

LIQUID CRYSTAL DISPLAY DEVICE

CROSS-REFERENCE TO RELATED APPLICATIONS

This is a Continuation Application of PCT Application No. PCT/JP03/05463, filed Apr. 28, 2003, which was published under PCT Article 21(2) in Japanese.

This application is based upon and claims the benefit of priority from prior Japanese Patent Application No. 2002-129996, filed May 1, 2002, the entire contents of which are incorporated herein by reference.

BACKGROUND OF THE INVENTION

1. Field of the Invention

The present invention relates to a liquid crystal display device using backlight light together with ambient light to provide a display.

2. Description of the Related Art

In recent years, liquid crystal display devices are applied to various fields of notebook personal computers, monitors, car navigations, mid- or small-size TV, portable telephones and the like. Among them, a reflection type liquid crystal display device does not require a backlight, and therefore, application thereof to a display for a mobile equipment such as a mobile PC or the like is studied to make use of an advantage of low power consumption, thinness and lightness.

Since the reflection type liquid crystal display device provides a display by utilizing ambient light, the brightness of a display screen depends on the illumination environment surrounding the display screen like paper. Particularly, nothing can be observed in a dark place. Therefore, recently, a liquid crystal display device which auxiliary utilizes an internal light source in dark illumination environment steps into the limelight. Such a liquid crystal display device is known, for example, as a semi-transmission type liquid crystal display device having a backlight which is an internal light source disposed behind a display screen or a reflection type liquid crystal display device having a front-light which is an internal light source disposed in front of a display screen.

By the way, in order to improve thinness and lightness while the power consumption is reduced in either of the liquid crystal display devices, it is necessary to enhance the light utilization efficiency as highly as possible. For this purpose, various improvement measures relating to optical films and liquid crystal modes are proposed. For example, Jap. Pat. Appln. KOKAI Publication No. 11-242226 discloses a semi-transmission type liquid crystal display device which enhances the light utilization efficiency by making different cell gaps between transmission regions and reflection regions obtained by dividing each pixel and utilizing a homogeneous mode.

However, the above improvement measures cannot make it possible to attain a sufficient viewing angle characteristic when the display device is viewed from an orientation or direction other than the front. That is, there occurs a problem that coloring becomes unnatural, the contrast is lowered or display of black and white is reversed. In order to solve the problem of viewing angle characteristic, a large number of methods for adding a viewing angle compensation film are proposed, for example, in Jap. Pat. Appln. KOKAI Publication No. 2000-258769. However, the conventional viewing angle compensation system has a large number of problems that the compensation effect is not sufficient, the cost becomes extremely high by using a plurality of expensive films, and at the same time, the thickness and weight of the liquid crystal display device are increased and mass production is difficult to attain because films which cannot be formed by a simple manufacturing process are used, for example.

BRIEF SUMMARY OF THE INVENTION

An object of this invention is to provide a liquid crystal display device which can solve the above problems and attain a preferable viewing angle characteristic without increasing the manufacturing cost.

According to a first aspect of this invention, there is provided a liquid crystal display device which comprises first and second electrode substrates, a liquid crystal layer which is held between the first and second electrode substrates and in which nematic liquid crystal molecules are arranged in substantially parallel to each of the substrates without distortion, first and second optical anisotropic elements respectively disposed on the first and second electrode substrates on the sides opposite to the liquid crystal layer, first and second half-wavelength plates respectively disposed on the first and second optical anisotropic elements, and first and second polarizing plates respectively disposed on the first and second half-wavelength plates, wherein the first electrode substrate includes a light transmitting section which permits backlight light incident from the first polarizing plate side to transmit therethrough and a light reflecting section which reflects ambient light incident from the second polarizing plate side and at least one of the first and second optical anisotropic elements is formed of two retardation plates having a retardation in a plane.

According to a second aspect of this invention, there is provided a liquid crystal display device which comprises first and second electrode substrates, a liquid crystal layer which is held between the first and second electrode substrates and in which nematic liquid crystal molecules are arranged in substantially parallel to each of the substrates without distortion, first and second optical anisotropic elements respectively disposed on the first and second electrode substrates on the sides opposite to the liquid crystal layer, first and second half-wavelength plates respectively disposed on the first and second optical anisotropic elements, and first and second polarizing plates respectively disposed on the first and second half-wavelength plates, wherein the first electrode substrate includes a light transmitting section which permits backlight light incident from the first polarizing plate side to transmit therethrough and a light reflecting section which reflects ambient light incident from the second polarizing plate side, at least one of the first and second optical anisotropic elements is formed of three retardation plates having a retardation in a plane and at least one of the three retardation plates is a nematic liquid crystal film of a structure having liquid crystal molecules whose optical axes continuously or gradually tilt depending on the position in a thickness direction.

According to a third aspect of this invention, there is provided a liquid crystal display device which comprises first and second electrode substrates, a liquid crystal layer which is held between the first and second electrode substrates and in which nematic liquid crystal molecules are arranged in substantially vertical to each of the substrates, first and second optical anisotropic elements respectively disposed on the first and second electrode substrates on the sides opposite to the liquid crystal layer, first and second half-wavelength plates respectively disposed on the first and second optical anisotropic elements, and first and second polarizing plates respectively disposed on the first and second half-wavelength plates, wherein the first electrode substrate includes a light transmitting section which permits backlight light incident from the first polarizing plate side to transmit therethrough and a light reflecting section which reflects ambient light incident from the second polarizing plate side, at least one of the first and second optical anisotropic elements is formed of a plurality of retardation films and the plurality of retardation films include liquid crystal films of a structure having discotic liquid crystal molecules whose optical axes are aligned with each other in a thickness direction.

In the above liquid crystal display devices, the number of films required for viewing angle compensation can be sufficiently reduced and a manufacturing process for the films can be made simple. Therefore, a preferable viewing angle characteristic can be attained without increasing the manufacturing cost.

DETAILED DESCRIPTION OF THE INVENTION

There will now be described in detail a semi-transmission type liquid crystal display device according to a first embodiment of this invention with reference to the accompanying drawings.

Figure 1:
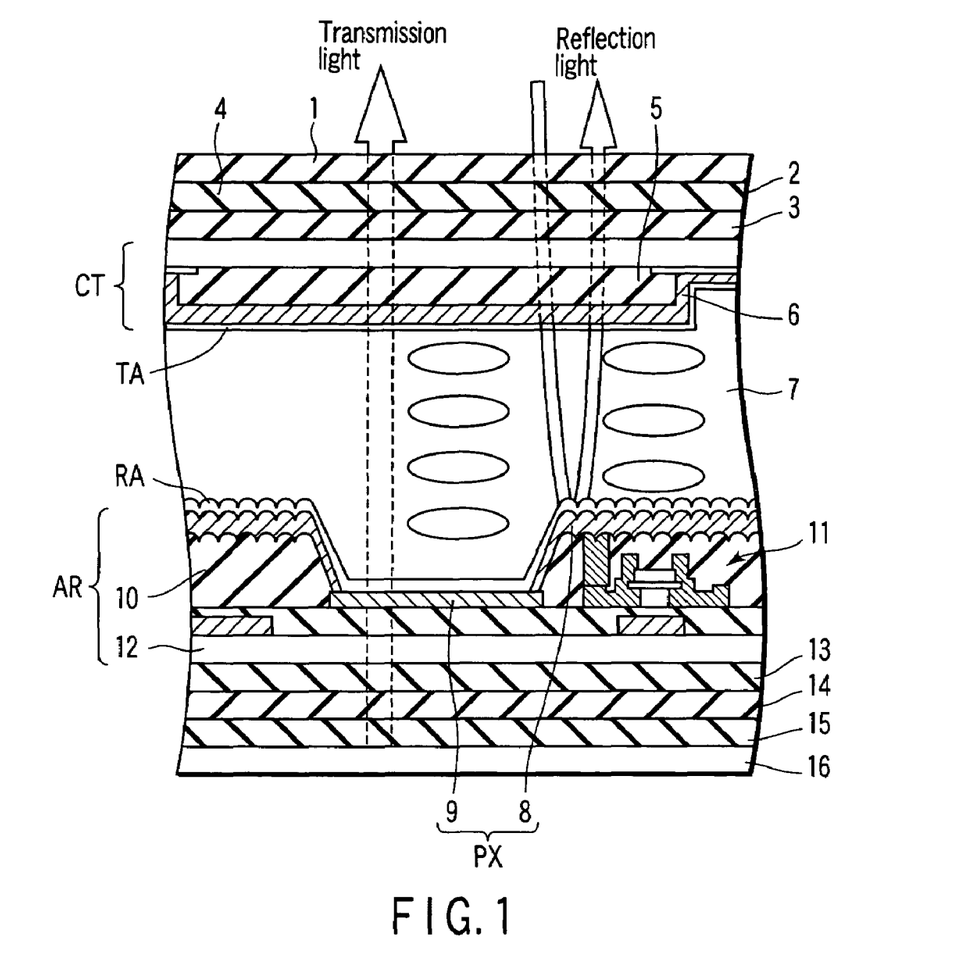
FIG. 1 is a view showing the cross sectional structure of a liquid crystal display device according to first to third embodiments of this invention.
Figure 2:
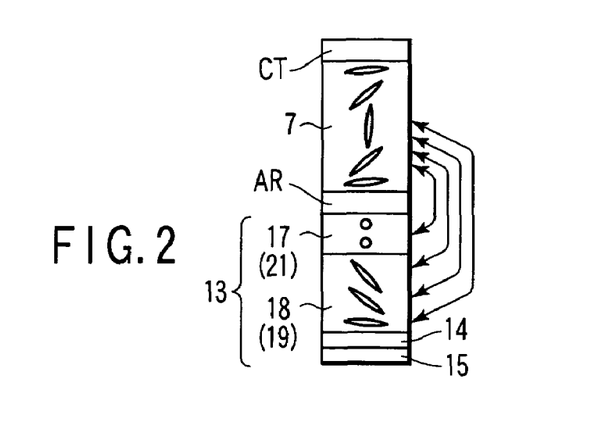
FIG. 2 is a view showing the viewing angle compensation structure of a retardation plate shown in FIG. 1.

FIG. 1 shows the cross sectional structure of the semi-transmission type liquid crystal display device. The semi-transmission type liquid crystal display device includes first and second electrode substrates AR, CT, a liquid crystal layer 7 which is held between the electrode substrates and in which nematic liquid crystal molecules are arranged in substantially parallel to each of the electrode substrates AR, CT without distortion, first and second optical anisotropic elements 3, 13 respectively disposed on the electrode substrates CT, AR on the sides opposite to the liquid crystal layer 7, first and second half-wavelength plates (which are hereinafter expressed as $\lambda/2$ plates) 2, 14 respectively disposed on the optical anisotropic elements 3, 13, first and second polarizing plates 1, 15 disposed on the $\lambda/2$ plates 2, 14, and a backlight 16 disposed on the polarizing plate 15. The electrode substrate CT includes a glass substrate 4, a color filter 5 disposed on the glass substrate 4 on the liquid crystal layer 7 side, and a transparent counter electrode 6 disposed to cover the color filter 5. The electrode substrate AR includes a glass substrate 12, a plurality of thin film transistor (TFT: Thin Film Transistor) portions 11 disposed on the glass substrate 12 on the liquid crystal layer 7 side, an uneven layer 10 disposed on the glass substrate 12 to cover the thin film transistor portions 11, and a plurality of pixel electrodes PX arrayed in a matrix form on the uneven layer 10 and switched by the plurality of thin film transistor portions 11. Each pixel electrode PX is divided in area into a reflection electrode 8 and transparent electrode 9. The optical anisotropic element 3 is a uniaxial retardation plate formed on the glass substrate 4 on the side opposite to the liquid crystal layer 7. As shown in FIG. 2, the optical anisotropic element 13 is formed of a uniaxial retardation plate 17 formed on the glass substrate 12 on the side opposite to the liquid crystal layer 7 and a liquid crystal film 18 formed on the uniaxial retardation plate 17. The pixel electrode PX and counter electrode 6 are respectively covered with first and second alignment films RA, TA. Further, the $\lambda/2$ plates 2 and 14 are retardation plates whose retardation in the film plane is approximately 270 nm, but they are expressed as the $\lambda/2$ plates to be distinguished from other retardation plates and the retardation is not limited to this.

In the liquid crystal display device, backlight light transmits through the transparent electrode 9 as transmission light and ambient light is reflected from the reflection electrode 8 as reflection light. The liquid crystal layer 7 provides a display by modulating the phases of the transmission light and reflection light in accordance with voltage between the pixel electrode PX and the counter electrode 6.

As shown in FIG. 1, the reflection electrode 8 configures a light reflecting section which reflects ambient light which is incident from the polarizing plate 1 side and the transmission electrode 9 configures a light transmitting section which permits backlight light incident from the polarizing plate 15 side to transmit therethrough. The liquid crystal layer 7 has different thicknesses on the light transmitting section and light reflecting section according to the uneven layer 10. The respective thicknesses are set to adequate values according to the type of a liquid crystal used as the liquid crystal layer 7. In the first embodiment, a nematic liquid crystal of refractive anisotropy $\Delta n=0.06$ was used, liquid crystal layer thickness $d1=5.9$ μm was set on the light transmitting section and liquid crystal layer thickness $d2=3.0$ μm was set on the reflecting section.

In a state where no voltage is applied to the liquid crystal layer 7, the alignment of liquid crystal molecules is set in substantially the same direction. The alignment film RA and alignment film TA are subjected to rubbing processes performed in anti-parallel (in directions which are parallel and opposite to each other) at the manufacturing time. For the specific rubbing direction, the alignment film TA is rubbed in a direction of 90° and the alignment film RA is rubbed in a direction of 270° if the coordinate system in which a direction of three o'clock with respect to the center of the screen as viewed from the polarizing plate 1 used as a display screen is set at 0° and an angle in a counterclockwise direction is positive is used as a reference.

The polarizing plate 1, λ/2 plate 2 and optical anisotropic element 3 have optical axes and retardations which are adequately set according to the thickness of the liquid crystal layer 7. In this case, the absorption axis of the polarizing plate 1 is set to 99°, the slow axis and retardation of the λ/2 plate 2 are respectively set to 27° and 270 nm and the slow axis and retardation of the uniaxial retardation plate of the optical anisotropic element 3 are respectively set to 90° and 95 nm.

On the other hand, the polarizing plate 15, λ/2 plate 14 and optical anisotropic element 13 also have optical axes and retardations which are set in the similar manner. In this case, the absorption axis of the polarizing plate 15 is set to 168°, the slow axis and retardation of the λ/2 plate 14 are respectively set to 150° and 269 nm and the slow axis and retardation of the uniaxial retardation plate 17 of the optical anisotropic element 13 are respectively set to 0° and 44 nm. Further, as the λ/2 plate 2, optical anisotropic element 3, uniaxial retardation plate 17 and λ/2 plate 1, a norbornene-series polymeric material is used.

The liquid crystal film 18 is obtained by solidifying nematic liquid crystal molecules whose optical axes have the same alignment as the optical axes of the liquid crystal molecules of the liquid crystal layer 7 in the same plane so that the optical axes can continuously or gradually tilt according to the positions in the thickness direction. The tilt angle and retardation of the nematic liquid crystal molecules can be adequately set, but in this case, as shown in FIG. 2, the tilt angle on the λ/2 plate 14 side is approximately 3° and the tilt angle on the uniaxial retardation plate 17 side is approximately 50°. The liquid crystal film 18 is used as a hybrid alignment film having liquid crystal molecules whose optical axes continuously tilt between the above angles and the tilt direction is set to 90° as viewed from the polarizing plate 1 side used as the display screen. Upon application of voltage, the liquid crystal molecules of the liquid crystal layer 7 and the liquid crystal molecules of the liquid crystal film 18 tilt up at opposite ends as shown in FIG. 2. In FIG. 2, the cross section of the liquid crystal display device as viewed from the side (0° direction) is shown. Further, the in-plane retardation of the liquid crystal film 18 was set to 140 nm. Also, it is possible to form the liquid crystal film 18 by solidifying a smectic liquid crystal having the same alignment as the nematic liquid crystal instead of the nematic liquid crystal.

Next, the viewing angle compensation effect of the liquid crystal display device according to the present embodiment is explained.

As shown in FIG. 2, the liquid crystal molecules of the liquid crystal layer 7 tilt up according to voltage applied to the liquid crystal layer 7 from the pixel electrode PX and counter electrode 6. When black display is provided, it is ideal that all of the liquid crystal molecules are set in a direction along the normal direction of the liquid crystal display device which coincides with the thickness direction of the liquid crystal layer 7. However, in practice, the liquid crystal molecules on the alignment film interface do not sufficiently tilt up due to alignment retaining force of the alignment films RA, TA. Further, in a case where the liquid crystal driving voltage is set low for the purpose of lowering the power consumption, the degree of tilting of the liquid crystal molecules on the interface is further lowered.

In this case, as shown in FIG. 2, the liquid crystal molecules are arranged based on the continuum theory to have tilts continuously increased towards the normal direction from the alignment film interface, set closest to the normal direction in substantially the intermediate position in the thickness direction of the liquid crystal layer 7, and continuously reduced towards the interface on the opposite side again.

It is general that the axial configuration and retardation of each film are set to attain sufficient contrast and transmittance and reflectance when viewing the liquid crystal display device from the front and it looks more attractive. However, in the conventional configuration utilizing only the uniaxial retardation plate, since an apparent retardation is shifted when the liquid crystal display device is viewed from a direction other than the front, the contrast is lowered and reverse of gradation occurs to significantly lower the display characteristic.

In order to avoid this, a biaxial retardation plate which cancels a variation in retardation of the liquid crystal display layer 7 occurring when viewing in a direction other than the front may be used. In the present embodiment, since the above retardation plate and liquid crystal film are associated with each other to attain a structure in which the variations caused in retardation by the viewing angle are cancelled between the retardation plate and liquid crystal molecules connected by use of arrows in FIG. 2, the viewing angle characteristic is enhanced.

In this case, the uniaxial retardation plate exhibits the viewing angle compensation effect with respect to the liquid crystal molecules near the interface of the alignment film and mainly improves the viewing angle when the eyepoint is swung to a direction perpendicular to the paper surface in FIG. 2 (in a right or left direction of the liquid crystal display device to be viewed). On the other hand, the liquid crystal film 18 exhibits the viewing angle compensation effect with respect to the liquid crystal molecules ranging from the interface of the liquid crystal layer 7 to the intermediate position and mainly improves the viewing angle when the eyepoint is swung to a right or left direction of the paper surface in FIG. 2 (in an upward or downward direction of the liquid crystal display device to be viewed).

Figure 3A:
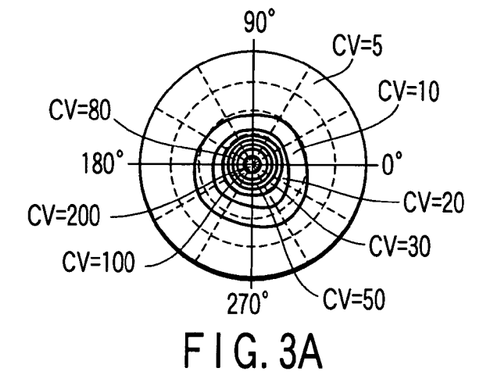
FIGS. 3A and 3B are diagrams showing the transmission viewing angle characteristic of the conventional liquid crystal display device and the transmission viewing angle characteristic of the liquid crystal display device shown in FIG. 1.
Figure 3B:
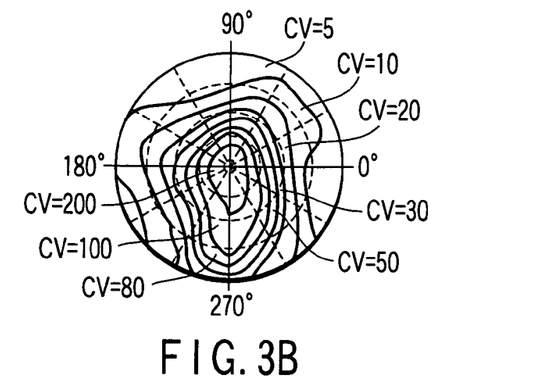

In a case where the liquid crystal display device is configured only by use of a uniaxial retardation plate like the conventional case, the liquid crystal display device has a viewing angle characteristic of contrast as shown in FIG. 3A at the transmission display time. On the other hand, in the liquid crystal display device according to the present embodiment, a viewing angle characteristic of contrast is improved as shown in FIG. 3B at the transmission display time. In FIG. 3A and FIG. 3B, CV indicates contrast values.

As described above, according to the present embodiment, the liquid crystal display device having a sufficiently wide viewing angle characteristic is obtainable with a film configuration easily realized by use of as a small number of sheets as possible.

Next, a liquid crystal display device according to a second embodiment of this invention is explained. The liquid crystal display device is configured in the same manner as the liquid crystal display device of the first embodiment except that the configuration of the optical anisotropic element 13 shown in FIG. 2 is changed. Specifically, the liquid crystal film 18 of the optical anisotropic element 13 is replaced by a liquid crystal film 19 having a discotic liquid crystal of a continuous tilt arrangement instead of the nematic liquid crystal. In the liquid crystal film 19, the tilt direction of the discotic liquid crystal molecules is the same as that of the liquid crystal film 18 and the cross section of the liquid crystal display device as viewed from the side (0° direction) is the same as that of FIG. 2. In this case, the discotic liquid crystal molecules are arranged so that the tilt angle of the optical axis (director) will continuously vary from 82° to 21° depending on the position in the thickness direction and the in-plane retardation of the liquid crystal film 19 becomes approximately 24 nm. Further, the slow axis and retardation of the uniaxial retardation plate 17 are respectively changed to 0° and 160 nm. Since the configuration other than the optical anisotropic element 13 is the same as in the first embodiment, the explanation is omitted.

In the liquid crystal display device of the present embodiment, a sufficiently wide viewing angle characteristic can be attained based on the same principle as in the first embodiment.

Next, a liquid crystal display device according to a third embodiment of this invention is explained. The liquid crystal display device is configured in the same manner as the liquid crystal display device of the first embodiment except that the configuration of the optical anisotropic element 13 shown in FIG. 2 is changed. Specifically, the uniaxial retardation plate 17 shown in FIG. 2 is replaced by a homogeneous alignment liquid crystal film 21 having the same axial angle and retardation. The configuration other than the uniaxial retardation plate 17 is entirely the same as in the liquid crystal display device of the first embodiment, the explanation is omitted.

In the present embodiment, in addition to enhancement of the same viewing angle characteristic as in the first embodiment, since the effect of compensating for wavelength dispersion of retardation of the liquid crystal layer 7 by use of the liquid crystal films 18 and 21 is attained, omission of light in the higher and lower wavelength ranges can be prevented and contrast and chromaticity characteristics are improved.

Figures 4, 5:
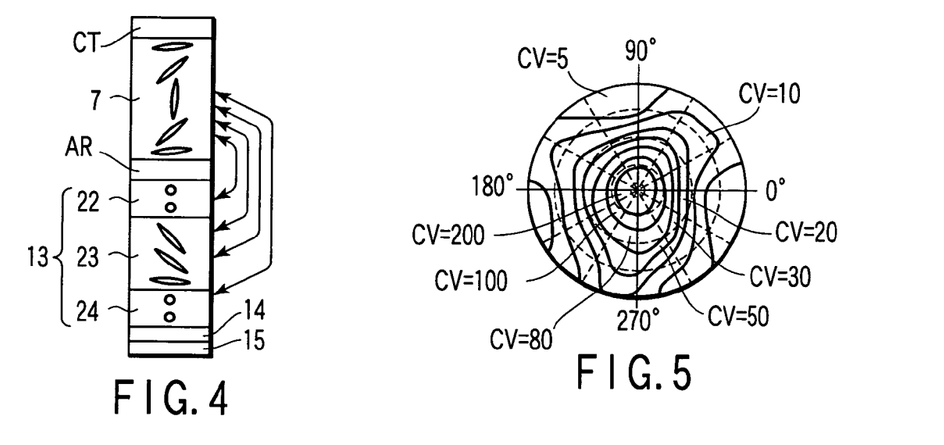
FIG. 4 is a view showing the viewing angle compensation structure of a retardation plate of a liquid crystal display device according to a fourth embodiment of this invention.
FIG. 5 is a diagram showing the transmission viewing angle characteristic of the liquid crystal display device obtained by use of the viewing angle compensation structure shown in FIG. 4.

Next, a liquid crystal display device according to a fourth embodiment of this invention is explained. The liquid crystal display device is configured in the same manner as the liquid crystal display device of the first embodiment except that the configuration of the optical anisotropic element 13 shown in FIG. 2 is changed. Specifically, as shown in FIG. 4, the optical anisotropic element 13 is configured by a uniaxial retardation plate 22 formed on a glass plate 12 on the side opposite to the liquid crystal layer 7, a liquid crystal film 23 formed on the uniaxial retardation plate 22 and a uniaxial retardation plate 24 formed on the liquid crystal film 23. The slow axis and retardation of the uniaxial retardation plate 22 are respectively set to 0° and 85 nm, the slow axis and retardation of the uniaxial retardation plate 24 are respectively set to 90° and 40 nm and the configuration of the liquid crystal film 23 is the same as the liquid crystal film 18 shown in FIG. 2.

The viewing angle compensation effect of the above liquid crystal display device is explained. The uniaxial retardation plate 22 more strongly compensates for liquid crystal molecules near the alignment film interface of the liquid crystal layer 7 than the liquid crystal display device according to the first embodiment. The liquid crystal film 23 compensates for a variation of the viewing angle of retardation of liquid crystal molecules located in a range from the alignment film interface of the liquid crystal layer 7 to the intermediate position in the thickness direction. The uniaxial retardation plate 24 makes compensation of the same amount as in the above embodiment with respect to retardation of the optical anisotropic element 13. The above liquid crystal display device can realize a further preferable viewing angle characteristic of transmission display as shown in FIG. 5. In FIG. 5, CV indicates contrast values.

Figures 6, 7:
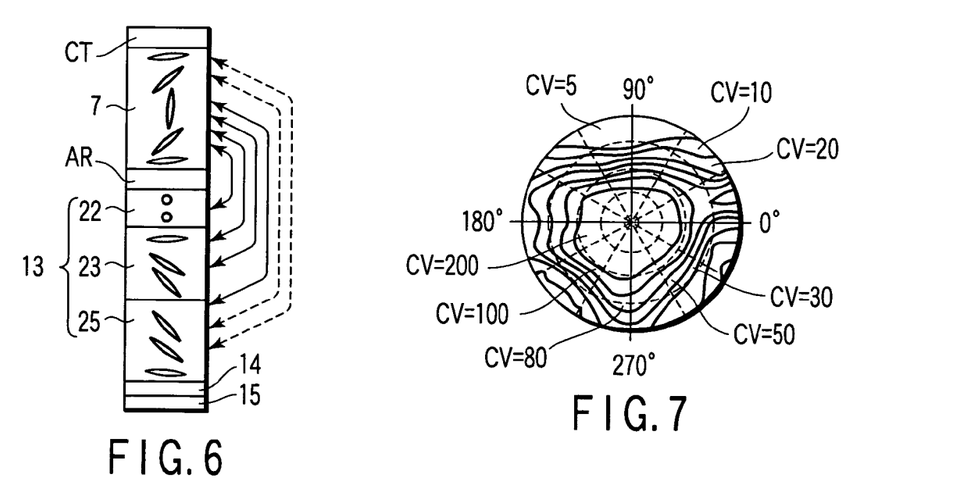
FIG. 6 is a view showing the viewing angle compensation structure of a retardation plate of a liquid crystal display device according to a fifth embodiment of this invention.
FIG. 7 is a diagram showing the transmission viewing angle characteristic of the liquid crystal display device obtained by use of the viewing angle compensation structure shown in FIG. 6.

Next, a liquid crystal display device according to a fifth embodiment of this invention is explained. The liquid crystal display device is configured in the same manner as the liquid crystal display device of the fourth embodiment except that the configuration of the optical anisotropic element 13 shown in FIG. 4 is changed. Specifically, the uniaxial retardation plate 24 shown in FIG. 4 is replaced by a liquid crystal film 25 as shown in FIG. 6. The liquid crystal film 25 has a configuration obtained by a nematic liquid crystal of an arrangement tilted in the same manner as in the liquid crystal film 23 shown in FIG. 4. However, the slow axis and retardation of the uniaxial retardation plate 22 are respectively set to 0° and 125 nm. Further, the liquid crystal films 23 and 25 have configurations in which the optical axes of liquid crystal molecules tilt towards the direction indicated in FIG. 6 and the in-plane retardations are each set to 110 nm.

The viewing angle compensation effect of the above liquid crystal display device is explained. As shown in FIG. 6, the uniaxial retardation plate 22 compensates for liquid crystal molecules near the alignment film interface of the liquid crystal layer 7, the liquid crystal film 23 compensates for liquid crystal molecules located in a range from the alignment film interface of the glass substrate 12 of the liquid crystal layer 7 to the intermediate position in the thickness direction, and the liquid crystal film 25 compensates for liquid crystal molecules located in a range from the intermediate position in the thickness direction of the liquid crystal layer 7 to the alignment film interface of the glass substrate 4. As shown in FIG. 7, the above liquid crystal display device can realize a further preferable viewing angle characteristic of transmission display. In FIG. 7, CV indicates contrast values.

Next, a liquid crystal display device according to a sixth embodiment of this invention is explained. The liquid crystal display device is configured in the same manner as the liquid crystal display device of the first embodiment except that the configurations of the optical anisotropic elements 3 and 13 shown in FIG. 2 are changed. Specifically, the optical anisotropic element 3 is configured by a uniaxial retardation plate 26 formed on a glass substrate 4 on the side opposite to a liquid crystal layer 7, and a liquid crystal film 27 formed on the uniaxial retardation plate 26. The slow axis and retardation of the uniaxial retardation plate 26 are respectively set to 0° and 38 nm, the liquid crystal film 27 has a nematic liquid crystal of an arrangement tilted in the same manner as in the liquid crystal film 18 shown in FIG. 2 and the in-plane retardation is set to 130 nm. In the optical anisotropic element 13, the retardation of the uniaxial retardation plate 17 is changed to 23 nm and the in-plane retardation of the liquid crystal film 18 is changed to 120 nm.

Figure 8:
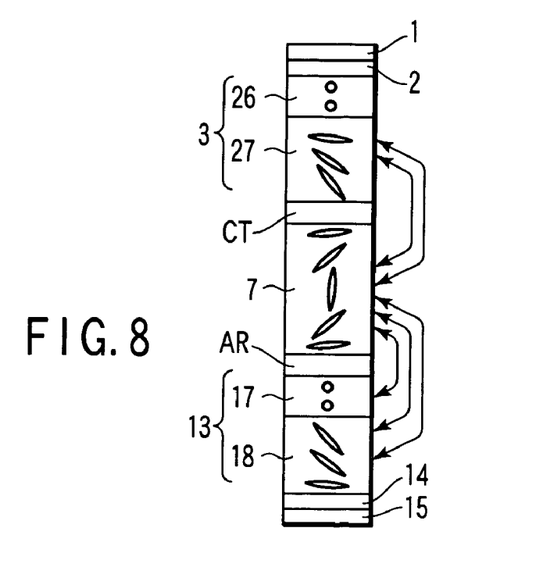
FIG. 8 is a view showing the viewing angle compensation structure of a retardation plate of a liquid crystal display device according to a sixth embodiment of this invention.
Figure 9A:
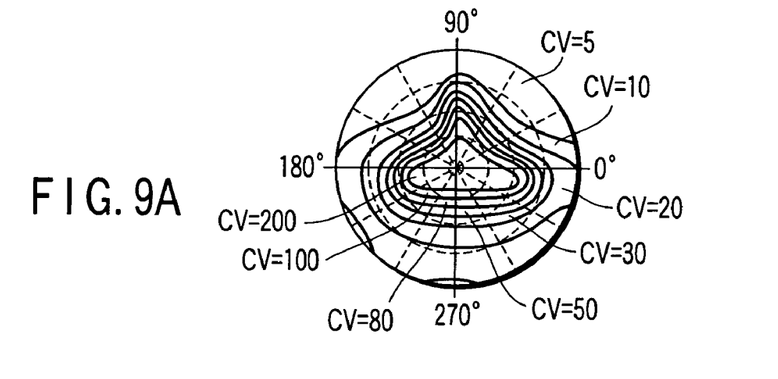
FIGS. 9A and 9B are diagrams showing the transmission viewing angle characteristic and reflection viewing angle characteristic of the liquid crystal display device obtained by use of the viewing angle compensation structure shown in FIG. 8.
Figure 9B:
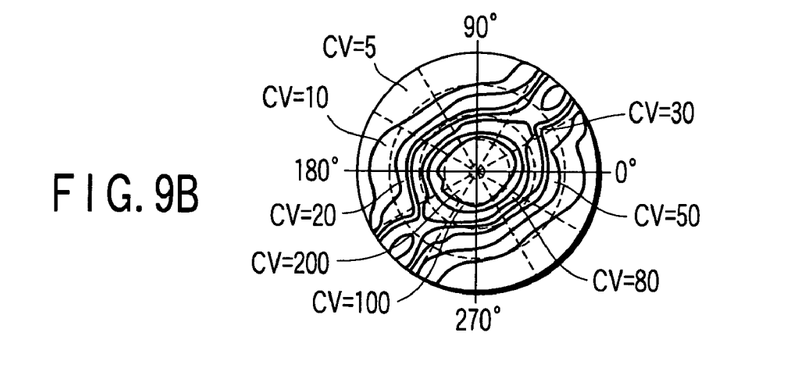

The viewing angle compensation effect of the above liquid crystal display device is explained. The uniaxial retardation plate 17 and liquid crystal film 18 of the optical anisotropic element 13 have the same effect as in the first embodiment. In addition, the liquid crystal film 27 of the optical anisotropic element 3 compensates for a viewing angle variation of retardation of liquid crystal molecules located in a range from the intermediate portion of the liquid crystal layer 7 to the alignment film interface on the glass substrate 4 side as shown in FIG. 8. FIG. 9A shows the transmission viewing angle characteristic and FIG. 9B shows the reflection viewing angle characteristic. The above liquid crystal display device can attain a further preferable viewing angle characteristic of transmission display and at the same time improve the viewing angle characteristic of reflection display as shown in FIGS. 9A and 9B. In FIG. 9A and FIG. 9B, CV indicates contrast values.

Figure 10:
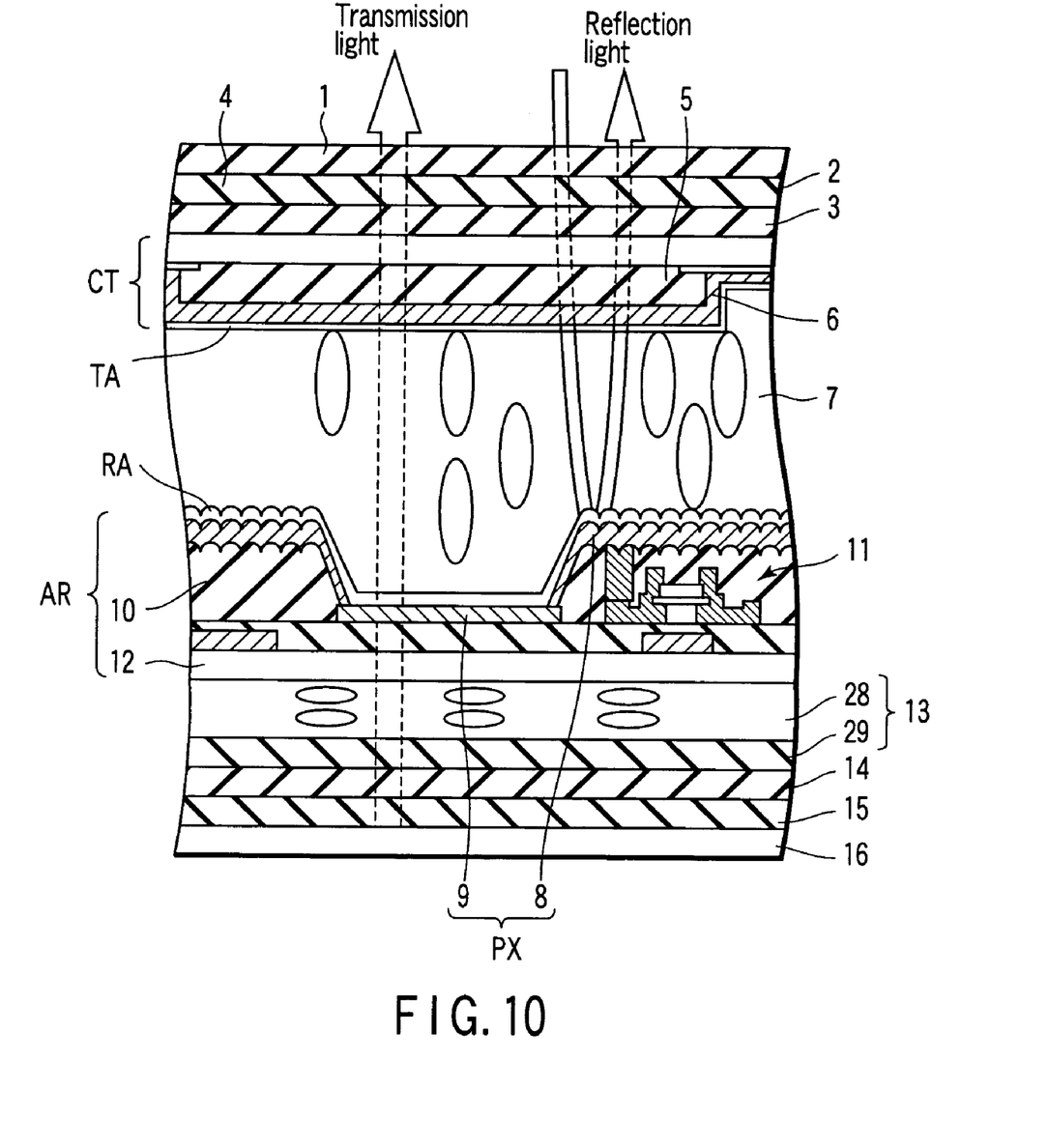
FIG. 10 is a view showing the cross sectional structure of a liquid crystal display device according to a seventh embodiment of this invention.

Next, a liquid crystal display device according to a seventh embodiment of this invention is explained. The liquid crystal display device is configured in the same manner as the liquid crystal display device of the first embodiment except that the configurations of the liquid crystal layer 7 and optical anisotropic element 13 shown in FIG. 1 are changed. As shown in FIG. 10, the liquid crystal layer 7 is a so-called VA (Vertical Alignment) mode in which nematic liquid crystal molecules are homeotropically arranged approximately vertical to each of electrode substrates AR, CT.

The optical anisotropic element 13 is configured by a uniaxial retardation plate 29 and liquid crystal film 28 of the uniaxial alignment structure having discotic liquid crystal molecules whose optical axes are aligned with each other in a thickness direction. The in-plane retardation of the liquid crystal film 28 and a retardation in the normal direction are respectively set to 0 nm and −350 nm. The slow axis and retardation of the uniaxial retardation plate 29 are respectively set to 90° and 96 nm.

The above liquid crystal display device is a normally black mode in which black display is provided in a voltage non-application state and liquid crystal molecules are arranged substantially vertical to each of the electrode substrates AR, CT at the time of black display. Therefore, the liquid crystal film 28 can preferably compensate for a viewing angle variation of retardation of the liquid crystal layer 7. Also, in the above liquid crystal display device, a further favorable viewing angle characteristic of transmission display can be realized.

Further, this invention is not limited to the configurations of the first to sixth embodiments and can be variously modified without departing from the scope thereof.

For example, there occurs no problem even if the thickness of the liquid crystal layer 7 and the optical axes and retardations of the respective films are adequately changed. Further, there occurs no problem even if the arrangement of the liquid crystal film and the retardation plate is reversed or the tilt angle of the liquid crystal film is reversed in the upper and lower positions. Further, there occurs no problem even if the λ/2 plates 2 and 14 are omitted. Also, the uniaxial retardation plate can be adequately replaced by a biaxial retardation plate. In either case, a sufficient viewing angle compensation effect can be attained. Further, it is desirable that the optical axes of the liquid crystal layer 7 and the tilt directions of the liquid crystal films 18, 19, 23, 25, 27 are set in the same plane, but the axes may be slightly shifted in order to compensate for a difference in the wavelength dispersion of the refractive index of each material and can be adequately adjusted to enhance the contrast.

The liquid crystal display device of each embodiment is an active matrix system using thin film transistors 11 to switch the pixel electrodes PX which drive the liquid crystal layer 7, but the thin film transistors 11 can be replaced by thin film diodes (TFD: Thin Film Diode). Further, the active matrix system may be changed to a simple matrix system. In this case, a yield at the manufacturing time and brightness with a low aperture ratio are enhanced and power consumption is lowered.

This invention can be used to attain a liquid crystal display device of a preferable viewing angle characteristic without increasing the manufacturing cost.

What is claimed is:

1. A liquid crystal display device comprising:
   first and second electrode substrates;
   a liquid crystal layer which is held between the first and second electrode substrates and in which nematic liquid crystal molecules are arranged in substantially parallel to each of the substrates without distortion;
   first and second optical anisotropic elements respectively disposed on the first and second electrode substrates on the sides opposite to the liquid crystal layer;
   first and second half-wavelength plates respectively disposed on the first and second optical anisotropic elements; and
   first and second polarizing plates respectively disposed on the first and second half-wavelength plates;
   wherein the first electrode substrate includes a light transmitting section which permits backlight light incident from the first polarizing plate side to transmit therethrough and a light reflecting section which reflects ambient light incident from the second polarizing plate side, and at least one of the first and second optical anisotropic elements is formed of two retardation plates having a retardation in a plane;
   wherein at least one of the two retardation plates is a liquid crystal film; and
   wherein the liquid crystal film is one of a nematic liquid crystal and smectic liquid crystal which are aligned and solidified.

2. A liquid crystal display device comprising:
   first and second electrode substrates;
   a liquid crystal layer which is held between the first and second electrode substrates and in which nematic liquid crystal molecules are arranged in substantially parallel to each of the substrates without distortion;
   first and second optical anisotropic elements respectively disposed on the first and second electrode substrates on the sides opposite to the liquid crystal layer;
   first and second half-wavelength plates respectively disposed on the first and second optical anisotropic elements; and
   first and second polarizing plates respectively disposed on the first and second half-wavelength plates;
   wherein the first electrode substrate includes a light transmitting section which permits backlight light incident from the first polarizing plate side to transmit therethrough and a light reflecting section which reflects ambient light incident from the second polarizing plate side, and at least one of the first and second optical anisotropic elements is formed of two retardation plates having a retardation in a plane; and
   wherein one of the two retardation plates is a liquid crystal film of a structure having liquid crystal molecules whose optical axes continuously or gradually tilt depending on the position in a thickness direction and the other one of the two retardation plates is a uniaxial retardation plate disposed between the liquid crystal film and the liquid crystal layer.

3. The liquid crystal display device according to claim 2, wherein the uniaxial retardation plate is a liquid crystal film.

4. A liquid crystal display device comprising:
   first and second electrode substrates;
   a liquid crystal layer which is held between the first and second electrode substrates and in which nematic liquid crystal molecules are arranged in substantially parallel to each of the substrates without distortion;

first and second optical anisotropic elements respectively disposed on the first and second electrode substrates on the sides opposite to the liquid crystal layer;

first and second half-wavelength plates respectively disposed on the first and second optical anisotropic elements; and first and second polarizing plates respectively disposed on the first and second half-wavelength plates;

wherein the first electrode substrate includes a light transmitting section which permits backlight light incident from the first polarizing plate side to transmit therethrough and a light reflecting section which reflects ambient light incident from the second polarizing plate side, at least one of the first and second optical anisotropic elements is formed of three retardation plates having a retardation in a plane, and at least one of the three retardation plates is a nematic liquid crystal film of a structure having liquid crystal molecules whose optical axes continuously or gradually tilt depending on the position in a thickness direction.

5. A liquid crystal display device comprising:

first and second electrode substrates;

a liquid crystal layer which is held between the first and second electrode substrates and in which nematic liquid crystal molecules are arranged in substantially vertical to each of the substrates;

first and second optical anisotropic elements respectively disposed on the first and second electrode substrates on the sides opposite to the liquid crystal layer;

first and second half-wavelength plates respectively disposed on the first and second optical anisotropic elements; and first and second polarizing plates respectively disposed on the first and second half-wavelength plates;

wherein the first electrode substrate includes a light transmitting section which permits backlight light incident from the first polarizing plate side to transmit therethrough and a light reflecting section which reflects ambient light incident from the second polarizing plate side, at least one of the first and second optical anisotropic elements is formed of a plurality of retardation films, and the plurality of retardation films include liquid crystal films of a structure having discotic liquid crystal molecules whose optical axes are aligned with each other in a thickness direction.

6. The liquid crystal display device according to claim 2, wherein the liquid crystal film is one of a nematic liquid crystal and smectic liquid crystal which are aligned and solidified.

* * * * *